US006404916B1

(12) United States Patent
De La Torre-Bueno

(10) Patent No.: US 6,404,916 B1
(45) Date of Patent: Jun. 11, 2002

(54) METHOD AND APPARATUS FOR APPLYING COLOR THRESHOLDS IN LIGHT MICROSCOPY

(75) Inventor: Jose De La Torre-Bueno, Encinitas, CA (US)

(73) Assignee: ChromaVision Medical Systems, Inc., San Juan Capistrano, CA (US)

( * ) Notice: Subject to any disclaimer, the term of this patent is extended or adjusted under 35 U.S.C. 154(b) by 0 days.

(21) Appl. No.: 09/631,611

(22) Filed: Aug. 4, 2000

Related U.S. Application Data

(60) Provisional application No. 60/147,374, filed on Aug. 4, 1999.

(51) Int. Cl.[7] .................................................. G06K 9/00
(52) U.S. Cl. ...................... 382/162; 382/167; 382/165; 382/274
(58) Field of Search ................................. 382/162, 167, 382/133, 165, 274; 358/518, 520, 523

(56) References Cited

U.S. PATENT DOCUMENTS

| 4,991,223 A | * | 2/1991 | Bradley | 382/165 |
| 5,087,965 A | | 2/1992 | Torre-Bueno | |
| 5,409,007 A | * | 4/1995 | Saunders et al. | 600/447 |
| 5,515,172 A | * | 5/1996 | Shiau | 358/298 |
| 5,533,628 A | | 7/1996 | Tao | |
| 5,799,105 A | * | 8/1998 | Tao | 382/167 |
| 5,911,327 A | | 6/1999 | Tanaka et al. | |
| 6,011,595 A | * | 1/2000 | Henderson et al. | 348/590 |
| 6,122,400 A | * | 9/2000 | Reitmeier | 382/166 |

OTHER PUBLICATIONS

Poynton, "Frequently Asked Questions About Color", www.inforamp.net/~poynton, Dec. 30, 1999, pp. 1–24.

* cited by examiner

Primary Examiner—Phuoc Tran
Assistant Examiner—Ali Bayat
(74) Attorney, Agent, or Firm—Fish & Richardson P.C.

(57) ABSTRACT

A color threshold analyzer includes a converter to convert signals representative of a pixel color value, e.g., red (R), green (G), and blue (B) signals, to signals representing hue (H), saturation (S), and intensity (I) values. Comparators are provided to compare the hue value to upper and lower hue reference values, the saturation value to a lower saturation reference value, and the intensity value to upper and lower intensity values. A switch may be provided to select a desired orientation (i.e., clockwise or counter-clockwise) on a polar hue scale to define the values between the upper ad lower hue reference values. A color identifier may output a signal indicating that the pixel color value corresponds to a desired color range in response to each of the H, S, and I values falling within their associated range.

15 Claims, 5 Drawing Sheets

METHOD AND APPARATUS FOR APPLYING COLOR THRESHOLDS IN LIGHT MICROSCOPY

CROSS-REFERENCE TO RELATED APPLICATIONS

This application claims priority to U.S. Provisional Patent Application Serial No. 60/147,374, filed Aug. 4, 1999.

BACKGROUND

The invention relates to the application of thresholds in light microscopy.

Light microscopy images may be automatically scanned to detect the presence of certain classes of objects, which may be distinguished from other classes of objects by unique characteristics, including color. Automatic scanning of an image for the presence of objects belonging to a particular class must allow for small variations in the characteristic color of the objects belonging to the class. Because real objects belonging to the class have a range of colors, rather than a single uniform characteristic color, they occupy a volume, rather than a single point, in a three-dimensional (3D) color space. Therefore, color ranges in the 3D color space may be defined, and if automatic scanning of an image detects colors within the range, the detection of an object belonging to the class may be registered.

The detection of a real class of objects by its color requires differentiating its characteristic color volume from color volumes of other objects. The characteristic color volume of a class of objects may be defined by digitizing the 3D color volume in color space. An object belonging to the class of object can then be detected by comparing the color of the object to a lookup table storing the digital representation of the 3D color volume. If each of the three colors defining the 3D color space is digitized to n bits, however, the lookup table of size $n^3$ bits would be required to determine whether an object were in the predefined object class or not, and large lookup tables hinder the speed at which the image can be scanned.

Alternatively, the color volume of a class of objects can be defined by minimum and maximum color thresholds for each of the three color coordinates of a 3D color space, i.e. by defining a rectilinear color volume that includes the smaller arbitrarily shaped color volume characteristic of the object class. An object belong to the class may then be detected by comparing its color to the minimum and maximum thresholds that define the rectilinear color volume. Using minimum and maximum color thresholds to define a color volume requires the storage of only six parameter values, which permits faster scanning of images. Since the rectilinear color volume is larger than the actual characteristic color volume of the class of objects, however, objects that do not belong to the class of objects, but whose color is similar to the characteristic color of the class, may be falsely detected as members of the class.

SUMMARY

A color threshold analyzer includes a converter to convert signals representative of a pixel color value, e.g., red (R), green (G), and blue (B) signals, to signals representing hue (H), saturation (S), and intensity (I) values. Comparators are provided to compare the hue value to upper and lower hue reference values, the saturation value to a lower saturation reference value, and the intensity value to upper and lower intensity values. A switch may be provided to select a desired orientation (i.e., clockwise or counter-clockwise) on a polar hue scale to define the values between the upper ad lower hue reference values.

A color identifier may output a signal indicating that the pixel color value corresponds to a desired color range in response to each of the H, S, and I values falling within their associated ranges.

The reference values may be analog or digital signals. Digital reference signals may be stored in registers associated with the comparators. Analog reference signals may be supplied to the comparators by digital-to-analog signals set from the bus of a host computer.

The color threshold analyzer may be implemented in hardware, software, or a combination of both.

DESCRIPTION OF DRAWINGS

Like reference symbols in the various drawings indicate like elements.

DETAILED DESCRIPTION

Figure 1:
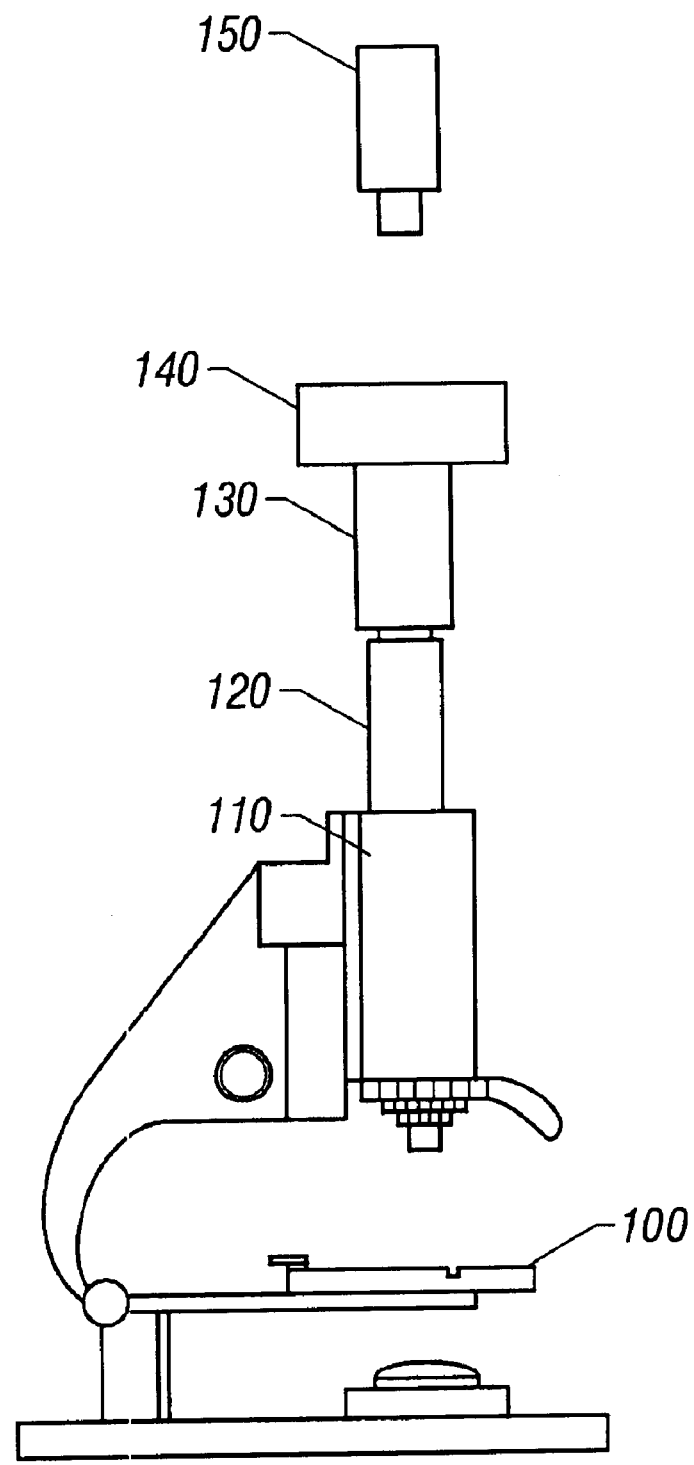
FIG. 1 is a schematic diagram of the imaging of a sample by a microscope.

Referring to FIG. 1, a sample 100 containing multiple objects of different types is viewed with a microscope 110, which creates an image 120 of the objects. Sample 100 may be a slide prepared with multiple cells of different types, and the cells may be stained with a dye to highlight contrasts in color between different types of cells in sample 100. Image 120 is digitized by digitizer 130, which may be internal to microscope 110, if microscope 110 is a digital microscope, or which maybe be external to microscope 110, if microscope 110 produces analog images of sample 100. Digitizer 130 produces a digital color image 140 of sample 100.

Digital color image 140 is composed of numerous pixels, which each have colors associated with them. Each pixel of digital color image 140 is analyzed by color analyzer 150, which measures the color content of the pixels at three different colors. Any three distinguishable colors may be used, but red, green, and blue are the colors most often sampled by color analyzer 150. Color analyzer 150 produces signals corresponding to the amount of color present in a pixel of digital color image 140 at each of the three distinguishable colors. Once the pixels of digital color image 140 have been analyzed for color by color analyzer 150, the detection of objects of different types may be performed by comparing the color signals to a characteristic 3D color volume of a particular type of object.

Figure 2:
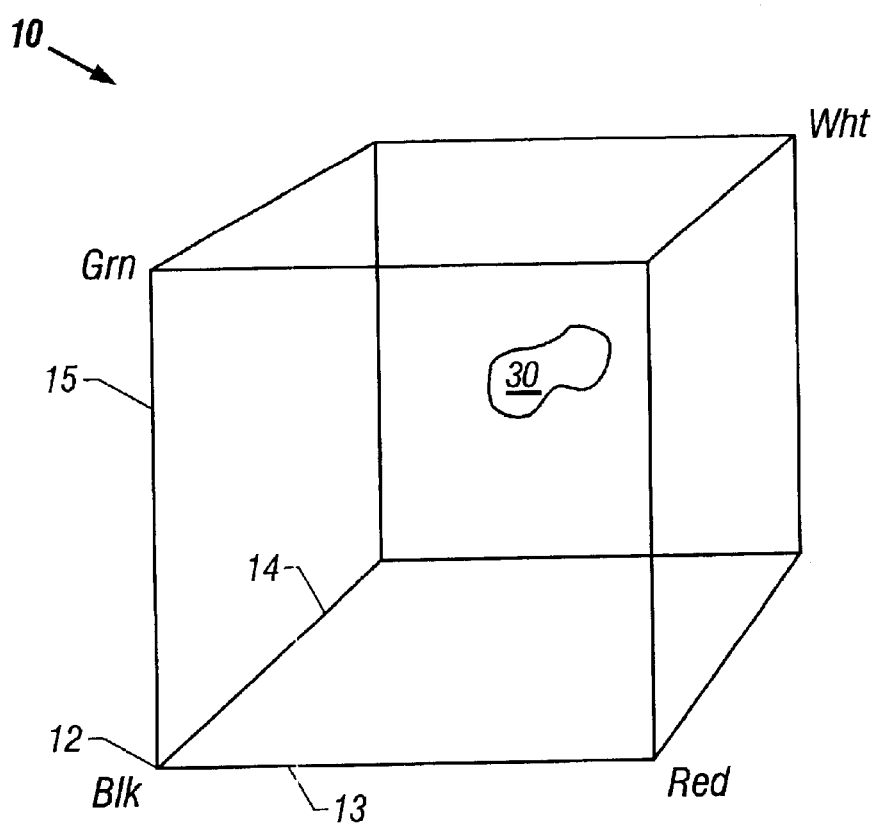
FIG. 2 is a view of three-dimensional RGB color coordinate system.

Referring to FIG. 2, a three dimensional (3D) color coordinate space 10 may be defined, in which black is assigned to the origin 12, and a red axis 13, a blue axis 14 and a green axis 15 define coordinates of the space. The characteristic color of a common class of objects may be represented by a color subvolume 30 within color space 10.

If a type of object has a characteristic color, the profile of subvolume 30 may be built by examining the color of a number of objects of that type. For example, a microscope slide sample 100 with cancer cells, normal cells and background regions may be prepared and imaged. The pixels of the digital color image 140 of sample 100 maybe be color analyzed and plotted in a 3D color coordinate space, to reveal three color subvolumes, characteristic of the cancer cells, healthy cells and background.

Figure 3:
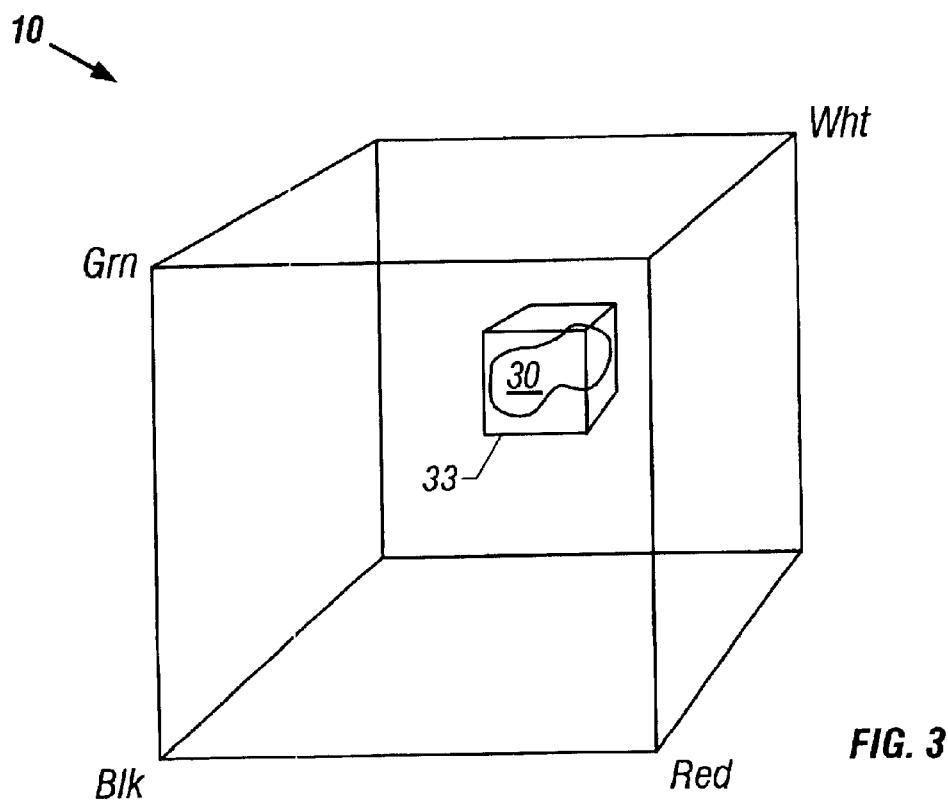
FIG. 3 is view of a threshold region bounding a color subvolume in RGB color space.

Referring to FIG. 3, a characteristic subvolume 30 may be bounded by a larger rectilinear volume 33 defined by six parameters that represent the minima and maxima of the red, green, and blue color coordinate values of subvolume 30. Rectilinear volume 33 can be defined by far fewer parameters than would be needed to define arbitrarily shaped characteristic color subvolume 30.

Figure 4:
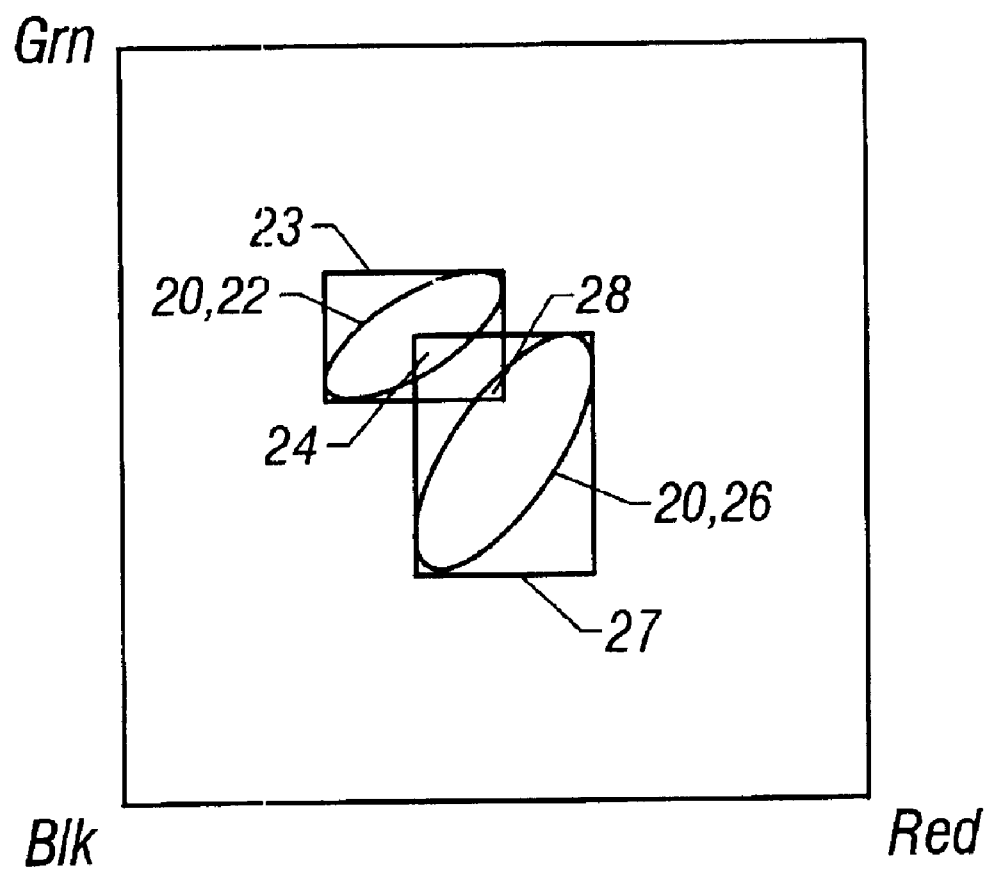
FIG. 4 is view of a two-dimensional projection of a three-dimensional color subvolume in RGB color space.

Referring to FIG. 4, two dimensional (2D) projections 20 of 3D subvolumes 30 may be displayed in a 2D color coordinate space 21. Projections 20 of characteristic color subvolumes 30 frequently are elongated along an axis between white and a saturated color in light microscopy. The elongation arises when a sample of objects, e.g. cells, varies in thickness or in dye uptake. The lighter or thinner portions appear mixed with white light, and the denser or thicker portions appear more saturated in color.

Two dimensional (2D) projections 20 of distinguishable 3D subvolumes 30 may be used to distinguish different types of objects. For example, an ovoid shaped projection of a characteristic subvolume of cancer cells 22 may be distinguishable from an ovoid shaped projection of a characteristic subvolume of healthy cells 26, i.e. ovoid projections 22, 26 do not overlap in 2D color space 21. If the characteristic color subvolumes 30 of cancer cells and healthy cells are parameterized by minimum and maximum color values and the resulting rectilinear subvolumes 33 are projected onto the 2D color space, however, their resulting rectangular projections 23, 27 may overlap. If rectangular projections 23, 27 are used to detect different types of objects, false detections may result because a point in region 24 that should be identified as characteristic of a cancer cell could be confused with a healthy cell since it falls in region 27 as well as in region 23. Similarly, a point in region 28 that should be identified as characteristic of a healthy cell could be confused with a cancer cell because it falls in region 23 as well as region 27. This is due both to the similar colors of cancer and healthy cells and the elongation of two dimensional (2D) projections 20 of 3D subvolumes 30.

Figure 5:
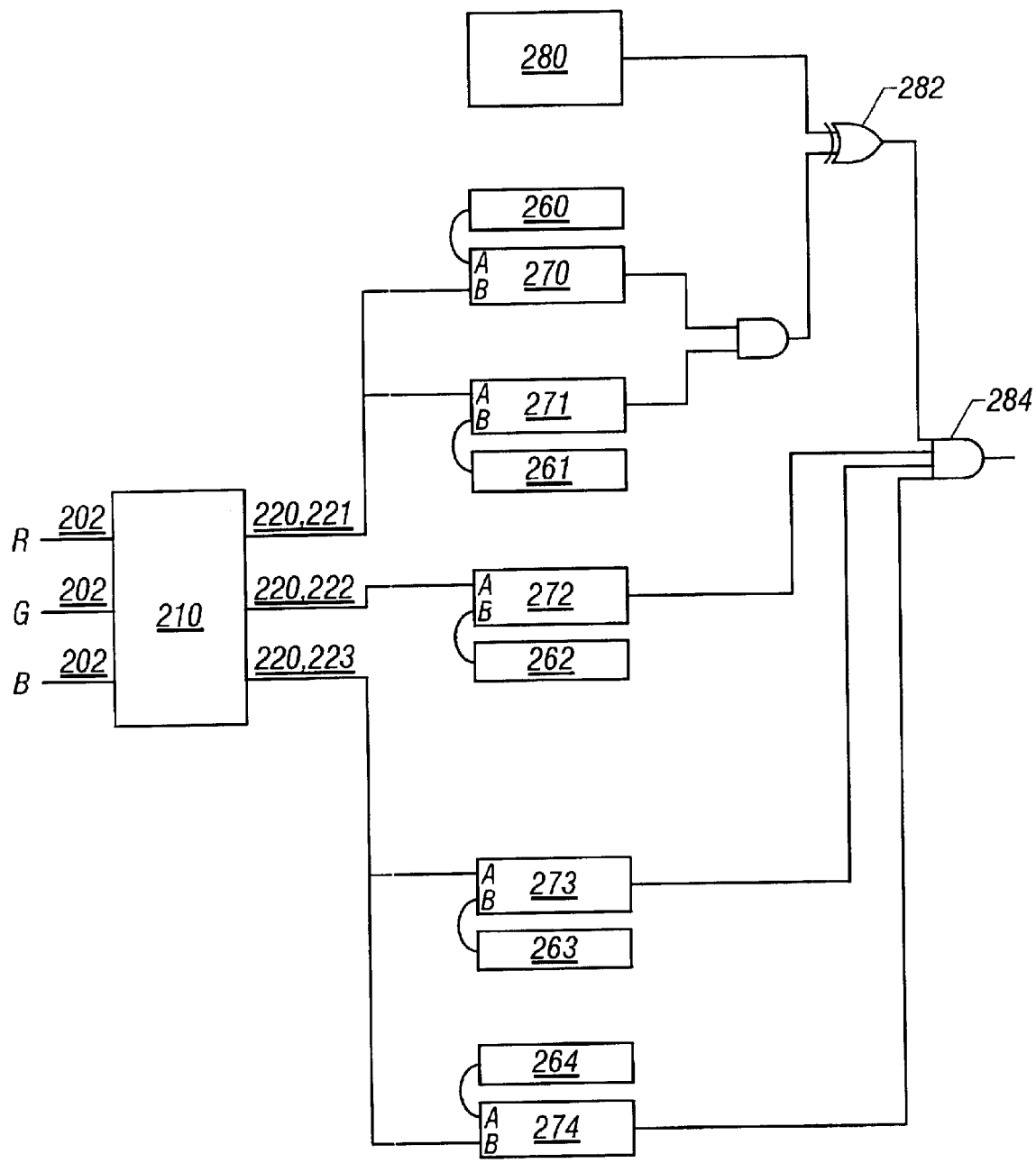
FIG. 5 is a schematic diagram of a circuit.

Characteristic 3D subvolumes 30 may, however, be distinguished using minimum and maximum color values to define a rectilinear region if a coordinate transformation of 3D color coordinate space 10, and all characteristic subvolumes 30 within it, is first performed. Referring to FIG. 5, a circuit 200 may receive three color signal inputs 202, which may be red, green, and blue, for each pixel of digital color image 140. Color signal inputs 202 are received by a converter 210 that converts the representation of a pixel's color from red, green, and blue (RGB) signals 202 to hue, saturation, and intensity signals (HSI) 220. The conversion of RGB signals 202 to HSI signals 220 is equivalent to a transformation from the rectilinear RGB coordinate system used in color space 10, to a cylindrical coordinate system in which hue is the polar coordinate, saturation is the radial coordinate, and intensity is the axial coordinate, whose axis lies on a line between black and white in coordinate space 10. A number of algorithms to perform this conversion are known, and computer chips are available to perform the algorithms.

Figure 6:
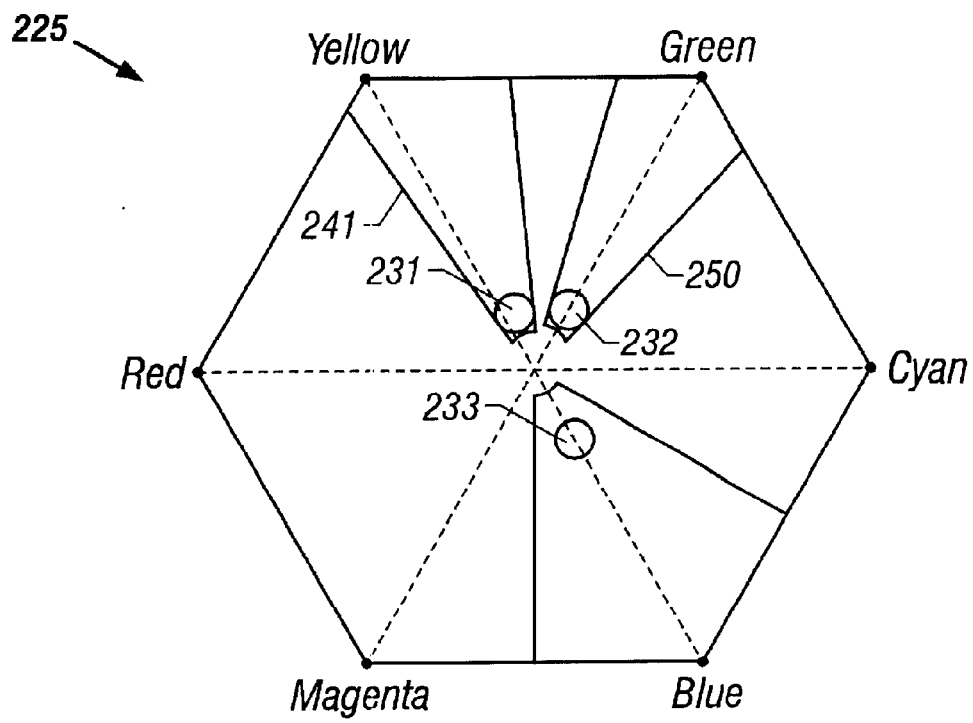
FIG. 6 is a view of a two-dimensional projection of a three-dimensional color subvolume in HSI color space.

Converter 210 generates HSI signals 220, including a hue, signal 221, a saturation signal 222, and an intensity signal 223. HSI signals 220 can be used to represent the characteristic color of a type of object in sample 100 in an HSI coordinate space. Referring to FIG. 6, 2D projections 230 of characteristic color 3D subvolumes of several types of objects may be displayed in a 2D hue-saturation (HS) coordinate space 225, where hue is the polar coordinate and saturation is the radial coordinate. For example, the 2D projection of the characteristic color of cancer cells 231 in sample 100 may have a yellow hue; the 2D projection of the characteristic color of healthy cells 232 may have a green hue; and the 2D projection of the characteristic color of background regions 233 may have a blue-cyan hue. The characteristic colors of the three different types of objects are distinguishable in HS space 225, as they are in RG space 21. In HS space 225, unlike RG space 21, however, minimum and maximum coordinate values may be defined that bound the characteristic color subvolumes of a type of object and which define distinguishable regions in HS space 225. Such minimum and maximum coordinate values may then be used to detect the presence of certain types of objects without false attribution of objects. For example, a region 241 that bounds the characteristic subvolume of cancer cells 231 may be defined by a minimum saturation value, a minimum hue angle, and a maximum hue angle. Region 241 is distinguishable from region 252 that completely bounds the characteristic subvolume of healthy cells 232, and which is defined by a different minimum saturation value, and different minimum and maximum hue angles. The axial intensity axis is suppressed for clarity purposes in FIG. 6, but the 3D regions defined by minimum and maximum hue, minimum and maximum saturation, and minimum and maximum intensity values characteristic of subvolumes of cancer cells and healthy cells do not overlap in the 3D HSI space either.

Further referring to FIG. 5, HSI signals 220 representing the color of a pixel may be used to determine if the pixel is part of the image of an object belonging to a particular class of objects, and thereby detect the presence of that type of object in sample 100. After viewing many objects of a particular type under similar conditions, a characteristic color subvolume in HSI space may be constructed and minimum and maximum thresholds values of hue, saturation, and intensity may be defined that bound the characteristic color subvolume. The threshold values may then be used in a circuit 200, to determine if a pixel belong to an object of a particular class of objects defined by the threshold values. In circuit 200 a hue maximum reference value 260, a hue minimum reference value 261, a saturation minimum reference value 262, an intensity maximum reference value 263, and an intensity minimum reference value 264 may be defined and stored as reference signals. The hue signal 221, saturation signal 222, and intensity signal 223 characterizing the color of the pixel may be compared to the respective reference signals using comparators 270–274. Comparators 270–274 have an input A and an input B and produce a TRUE output if their A input is greater than their B input. The settable hue in/out bit 280 and the XOR gate 282 are necessary because hue is a polar coordinate and the predefined hue range can stretch from a higher hue number through zero to a lower number. If the in/out bit 280 is set HIGH, the output of XOR gate 282 is TRUE if the hue of the pixel is above the hue minimum reference value 261 and below hue maximum reference value 262. If the in/out bit 280 is set LOW, the output of XOR gate 282 is TRUE if the hue of the pixel is below the hue minimum reference value 261 and above the hue maximum reference value 262. AND gate 284 produces a TRUE signal if HSI signals 221–223 corresponding to the pixel's color are within the range defined by reference signals 260–264. A TRUE signal from AND gate 284 indicates that the color of the pixel lies within the characteristic subvolume of the type of object to be detected. HSI signals 221–223 and references 260–264 may be digital or analog. Reference signals 260–264 may be set in a number of ways, for example, by setting digital latches or by a digital-to-analog signal set from the bus of a computer.

Figure 7:
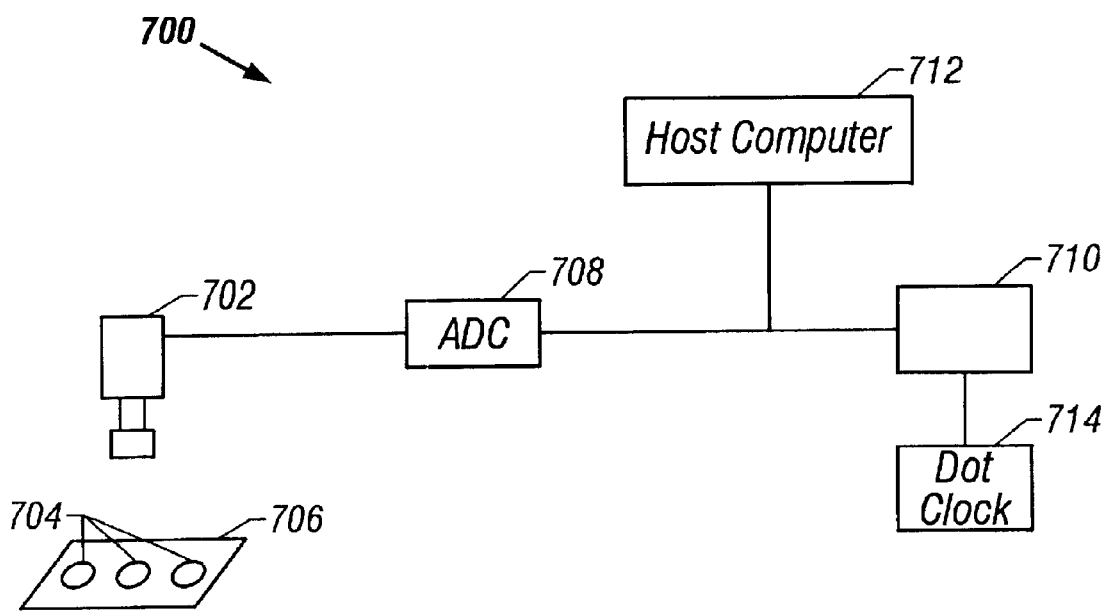
FIG. 7 is a schematic diagram of a machine vision system according to an embodiment.

FIG. 7 illustrates a machine vision system 700 according to an embodiment that includes the circuit 200 shown in FIG. 5. The machine vision system may be used to inspect objects based on color in an industrial application. A camera (or electronic microscope) 702, which may produce analog or digital signals, scans the images of objects 704 on a background 706. The output of the camera may be digitized (if analog) by an analog-to-digital converter (ADC) 708. The objects may be stationary or moved under the camera 702 by a conveyor system. The reference signals 260–264 may be set by a host computer 712. The circuit 200 may be connected to a dot clock 114. The circuit 200 may analyze pixels at a dot clock rate for real time analysis of the objects.

According to an embodiment, the RGB and HIS color values are eight bit words. According to alternate embodiments, the system may operate on more or less than eight bit color values. According to these embodiments, the comparators, registers, and logic units have a depth large enough to accommodate the size of the color values.

A machine vision system according to an embodiment may be used for a variety of industrial and medical applications including, for example, inspecting colored components in a work piece, produce, color-coded pills, textiles, and stained cells.

The techniques described here may be implemented in hardware or software, or a combination of the two. The techniques may be implemented in computer programs executed on one or more programmable computers that may each includes a processor, a storage medium readable by the processor (including volatile and non-volatile memory and/or storage elements), and suitable input and output devices. The programmable computers may be either general-purpose computers or special-purpose, embedded systems.

A number of embodiments of the invention have been described. Nevertheless, it will be understood that various modifications may be made without departing from the spirit and scope of the invention. Accordingly, other embodiments are within the scope of the following claims.

What is claimed is:

1. Apparatus comprising:
    a converter to convert a signal representative of a pixel color value to a plurality of signals representative of component color values including a hue value, a saturation value, and an intensity value;
    a hue comparator to determine if the hue value falls within a first range of values;
    a saturation comparator to determine if the saturation value falls within a second range of values;
    an intensity comparator to determine if the intensity value falls within a third range of values; and
    a color identifier connected to each of said hue comparator, said saturation comparator, and said intensity comparator, said color identifier adapted to output a signal representative of a selected color range in response to the hue value falling within the first range of values, the saturation value falling within the second range of values, and the intensity value falling within the third range of values,
    wherein said first range of values, said second range of values, and said third range of values defined a non-rectangular subvolume in Hue, Saturation, Intensity (HSI) color space,
    wherein the first range of values comprises a plurality of values between a low hue reference value and a high hue reference value,
    wherein the second range of values comprises a plurality of values above a low saturation value, and
    wherein the third range of values comprises a plurality of values between a low intensity value and a high intensity value.

2. The apparatus of claim 1, wherein the signal representative of the pixel color value comprises a plurality of signals representative of component color values including a red value, a green value, and a blue value.

3. The apparatus of claim 1, wherein the second range of values comprises a range of values between the low saturation value and a high saturation value.

4. The apparatus of claim 1, wherein each of said reference values comprises a digital value stored in an associated register connected to one of said comparators.

5. The apparatus of claim 1, wherein each of said reference values comprises an analog value supplied by an associated voltage source connected to one of said comparators.

6. The apparatus of claim 1, wherein the color identifier comprises an AND logic unit.

7. The apparatus of claim 1, further comprising a dot clock connected to the color identifier, wherein the color identifier operates at a dot clock rate.

8. Apparatus comprising:
    a converter to convert a signal representative of a pixel color value to a plurality of signals representative of component color values including a hue value, a saturation value, and an intensity value;
    a hue comparator to determine if the hue value falls within a first range of values;
    a saturation comparator to determine if the saturation value falls within a second range of values;
    an intensity comparator to determine if the intensity value falls within a third range of values;
    a color identifier connected to each of said hue comparator, said saturation comparator, and said intensity comparator, said color identifier adapted to output a signal representative of a selected color range in response to the hue value falling within the first range of values, the saturation value falling within the second range of values, and the intensity value falling within the third range of values; and
    a hue scale orientation switch connected between the hue comparator and the color identifier, said switch adapted to identify the first range of values as being one of a first range of values in a first scale direction or a second range of values in a second scale direction,
    wherein said first range of values, said second range of values, and said third range of values defined a non-rectangular subvolume in Hue, Saturation, Intensity (HSI) color space.

9. The apparatus of claim 8, wherein the hue scale orientation switch comprises a hue in/out switch and an XOR logic unit having a first input connected to the hue in/out switch, a second input connected to the hue comparator, and an output connected to the color identifier.

10. A method comprising:

converting a signal representative of a pixel color value to a plurality of signals, each signal representative of a component color value including a hue value, a saturation value, and an intensity value;

for each component color value, setting an associated range of values, said ranges together defining a non-rectangular subvolume in Hue, Saturation, Intensity (HSI) color space;

determining whether each of said component values falls within the associated range of values; and outputting a signal indicating said pixel color value falls within said color range in response to each of said component values falling within the associated range of values, wherein the range of values associated with the hue value comprises a range of values between a high hue value and a low hue value, the range of values associated with the saturation value comprises a range of values above a low saturation value, and the range of values associated with the intensity value comprises a range of values between a high intensity value and a low intensity value.

11. The method of claim 10, wherein the signal representative of the pixel color value comprises a plurality of signals representative of component color values including a red value, a green value, and a blue value.

12. The method of claim 10, wherein the signals indicating said pixel color range falls within said color rage are output at a dot clock rate.

13. An apparatus including instructions residing on a machine-readable medium for use in a vision system for identifying color pixels that fall within a color range, the instructions causing the machine to:

convert a signal representative of a pixel color value to a plurality of signals, each signal representative of a component color value including a hue value, a saturation value, and an intensity value;

for each component color value, setting an associated range of values, said ranges together defining a non-rectangular subvolume in Hue, Saturation, Intensity (HSI) color space;

determine whether each of said component values falls within the associated range of values; and output a signal indicating said pixel color value falls within said color range in response to each of said component values falling within the associated range of values, wherein the range of values associated with the hue value comprises a range of values between a high hue value and a low hue value, wherein the range of values associated with the saturation value comprises a range of values above a low saturation value, and wherein the range of values associated with the intensity value comprises a range of values between a high intensity value.

14. The apparatus of claim 13, wherein the signal representative of the pixel color value comprises a plurality of component values including a red value, a green value, and a blue value.

15. The apparatus of claim 13, wherein the signals indicating said pixel color range falls within said color rage are output at a dot clock rate.

* * * * *